United States Patent [19]

Brünnemann et al.

[11] Patent Number: 6,001,947
[45] Date of Patent: Dec. 14, 1999

[54] COATING AGENT BASED ON A HYDROXYL GROUP-CONTAINING POLYACRYLATE RESIN AND ITS USE IN PROCESSES FOR PRODUCING A MULTICOAT PAINT SYSTEM

[75] Inventors: Michael Brünnemann; Harald Borgholte, both of Münster; Peter Hoffmann, Senden; Olaf Hallmann, Münster, all of Germany; Bernhard Rubbert, Farmington-Hills, Mich.

[73] Assignee: BASF Coatings AG, Muenster-Hiltrup, Germany

[21] Appl. No.: 08/973,060

[22] PCT Filed: May 25, 1996

[86] PCT No.: PCT/EP96/02153

§ 371 Date: Feb. 4, 1998

§ 102(e) Date: Feb. 4, 1998

[87] PCT Pub. No.: WO96/38490

PCT Pub. Date: Dec. 5, 1996

[30] Foreign Application Priority Data

May 31, 1995 [DE] Germany .............................. 195 19 807

[51] Int. Cl.⁶ .................................................. C08G 18/61
[52] U.S. Cl. ............................ 528/28; 525/123; 427/386; 427/387; 428/423.1
[58] Field of Search ................................ 528/28; 525/123; 427/386, 387; 428/423.1

[56] References Cited

U.S. PATENT DOCUMENTS

| 4,673,718 | 6/1987 | Ryntz et al. ............................... 525/476 |
| 5,670,600 | 9/1997 | Nienhaus et al. .......................... 528/75 |

FOREIGN PATENT DOCUMENTS

| 0 449 613 A3 | 3/1991 | European Pat. Off. ....... C08J 299/08 |
| 0 550 259 A1 | 12/1992 | European Pat. Off. ....... C08F 299/08 |
| 41 19 857 A1 | 6/1991 | Germany ..................... C09D 133/14 |
| 41 24 167 A1 | 1/1993 | Germany ..................... C08F 220/28 |
| 95/02005 | 1/1995 | WIPO . |

OTHER PUBLICATIONS

6001 Chemical Abstracts; "Acrylic polyurethane coating compositions" Apr. 19, 1993 No. 16, Columbus, Ohio, US; JP04, 292,674.

*Primary Examiner*—Rachel Gorr

[57] ABSTRACT

The present invention relates to a coating composition comprising (A) at least one hydroxyl-containing polyacrylate resin, (B) at least one isocyanate crosslinking agent and, if desired, (C) at least one hydroxyl-containing polyester-modified polyacrylate resin, wherein the polyacrylate resin (A) is obtainable by polymerizing (a1) at least one essentially carboxyl-free (meth)acrylic ester, (a2) at least one copolymerizable, hydroxyl-containing monomer which is different from (a3)

(a3) at least one reaction product of acrylic acid and/or methacrylic acid with the glycidyl ester of an α-branched monocarboxylic acid having 5 to 18 carbon atoms per molecule, (a4) if desired, an [sic] at least one carboxyl-containing monomer, (a5) at least one polysiloxane macromonomer having a number-average molecular weight of from 1000 to 40,000 and on average from 0.5 to 2.5 ethylenically unsaturated double bonds per molecule or having on average from 0.5 to 2.5 epoxide groups per molecule, (a6) at least one aromatic vinyl compound, and (a7) if desired, at least one additional, essentially carboxyl-free monomer, the nature and quantity of the monomers being selected such that the polyacrylate resin (A) has the desired OH number and acid number, and the quantity of (a5) being less than 5% by weight.

20 Claims, No Drawings

COATING AGENT BASED ON A HYDROXYL GROUP-CONTAINING POLYACRYLATE RESIN AND ITS USE IN PROCESSES FOR PRODUCING A MULTICOAT PAINT SYSTEM

The present invention relates to a coating composition comprising (A) at least one hydroxyl-containing polyacrylate resin and (B) at least one isocyanate crosslinking agent.

The present invention additionally relates to processes for the production of a multilayer protective and/or decorative coating on a substrate surface and to the use of the coating compositions in the area of automotive refinishing.

Particularly those coating compositions which are employed in the area of automotive refinishing are subject to very high quality requirements. For instance, these coating compositions must be capable of curing fully at low temperatures ($\leq 100°$ C., preferably $\leq 80°$ C.) and must, in so doing, be dust-dry and tack-free after less than 7 h. Further requirements are good solvent resistance, weathering resistance, masking resistance, yellowing resistance, sandability and a low intrinsic color of the resulting coatings. Furthermore, the coatings must be overcoatable, in order to ensure that paint damage in the adjacent region and in the region of the refinish can also be repaired.

Especially in the area of the coating of large vehicles, for example the coating of truck bodies, the masking resistance of the resulting coatings is important. In the case of large vehicles, indeed, it is common for text to be applied, which necessitates the adjacent region being masked off. If masking resistance is inadequate, it is necessary to remove the marks by laborious sanding and polishing by hand, which is associated with a considerable expenditure.

DE-A-41 24 167, then, discloses clearcoats for automative finishing, whose binders comprise copolymers in which from 9 to 20% by weight of a methoxy-functional polysiloxane are incorporated by condensation. However, owing to the high proportion of polysiloxane, these clearcoats known from DE-A-41 24 167 have the disadvantage that the topcoat appearance and/or the leveling of the clearcoats is adversely affected.

Furthermore, EP-A-603 561 discloses coating compositions whose binders comprise copolymers in which from 3 to 40% by weight of an $\alpha,\omega$-hydroxy-, carboxy- and/or epoxy-functional polysiloxane have been incorporated by polymerization.

In addition, JP-A 2-163177 discloses a coating composition which is based on hydroxyl-containing acrylate copolymers and polyisocyanates and which is employed in particular as an architectural coating composition. Features of these coatings are an improved weathering stability, which is achieved by incorporating, by polymerization, from 0.5 to 15% by weight of a polysiloxane macromonomer into the hydroxyl-containing acrylate copolymer. The use of a reaction product of acrylic and/or methacrylic acid with the glycidyl ester of an $\alpha$-branched monocarboxylic acid having 5 to 18 carbon atoms per molecule as monomer component for preparing the acrylate copolymers, however, is not described in this document.

These coating compositions known from JP-A 2-163177 have the particular disadvantage that the topcoat appearance and/or leveling of the described coating compositions is adversely affected by the high siloxane content of the copolymers which are employed as binders.

U.S. Pat. No. 4,754,014 discloses coating compositions based on hydroxyl-containing acrylate copolymers which are modified with polysiloxane macromonomers. The polysiloxane macromonomers are prepared by reacting a hydroxy-functional polysiloxane with an epoxy-functional acrylate.

These coating compositions known from U.S. Pat. No. 4,754,014 exhibit high flexibility and are therefore particularly suitable for the coating of plastics materials, for example fenders. These coating compositions are different from the coating compositions of the present application, especially in that the use of a reaction product of acrylic and/or methacrylic acid with the glycidyl ester of an $\alpha$-branched monocarboxylic acid having 5 to 18 carbon atoms per molecule as monomer component for preparing acrylate copolymers is not described in this document.

Finally, EP-B-175092 discloses that the leveling properties, the lubricity and the mar resistance of coatings can be improved by adding polyester-modified siloxanes which are free from polyether groups to the coating compositions. The use of polymerizable, ethylenically unsaturated polysiloxane macromonomers to modify binders based on acrylate copolymers is not described in EP-B 175092.

The object of the present invention is therefore to provide coating compositions based on hydroxyl-containing polyacrylate resins and isocyanate cross-linking agents, which compositions lead to overcoatable coatings having a good weathering resistance and good solvent and chemical resistance. In order to be suitable for use for the area of automotive refinishing, the coating compositions should additionally be capable of curing at low temperatures and, in doing so, of leading to dust-dry and tack-free surfaces after as short a time as possible. Furthermore, the coating compositions should be sandable, should possess overcoatability even without initial sanding, and should have good masking resistance and spray mist uptake.

Finally, the abovementioned properties should be achieved even if the coating compositions are applied at low temperatures from about 8 to 12° C.

This object is surprisingly achieved by a coating composition comprising (A) at least one hydroxyl-containing polyacrylate resin and (B) at least one isocyanate crosslinking agent.

The coating composition is characterized in that the polyacrylate resin is obtainable by polymerizing, in an organic solvent or solvent mixture and in the presence of at least one polymerization initiator, (a1) an essentially carboxyl-free (meth)acrylic ester which is different from (a2), (a3), (a5), (a6) and (a7) and is copolymerizable with (a2), (a3), (a4), (a5), (a6) and (a7), or a mixture of such monomers, (a2) an ethylenically unsaturated monomer which carries at least one hydroxyl group per molecule and is essentially carboxyl-free, and is copolymerizable with (a1), (a3), (a4), (a5), (a6) and (a7) and is different from (a3), or a mixture of such monomers, (a3) at least one reaction product of acrylic acid and/or methacrylic acid with the glycidyl ester of an $\alpha$-branched monocarboxylic acid having 5 to 18 carbon atoms per molecule or, instead of the reaction product, an equivalent quantity of acrylic and/or methacrylic acid which then, during or after the polymerization reaction, is reacted with the glycidyl ester of an $\alpha$-branched monocarboxylic acid having 5 to 18 carbon atoms per molecule, (a4) if desired, an ethylenically unsaturated monomer which carries at least one carboxyl group per molecule and is copolymerizable with (a1), (a2), (a3), (a5), (a6) and (a7), or a mixture of such monomers, (a5) a polysiloxane macromonomer having a number-average molecular weight of from 1000 to 40,000 and on average from 0.5 to 2.5 ethylenically unsaturated double bonds per molecule or having on average from 0.5 to 2.5 epoxide groups per molecule, or a mixture of such monomers, (a6) an aromatic vinyl hydrocarbon, or a mixture of such monomers, and (a7) if desired, an essentially carboxyl-free, ethylenically unsaturated monomer which is copolymerizable with (a1), (a2), (a3), (a4), (a5) and (a6) and is different from (a1), (a2), (a3), (a5) and (a6), or a mixture of such monomers, the nature and quantity of (a1), (a2), (a3), (a4), (a5), (a6) and (a7) being selected such that the polyacrylate resin (A) has the desired OH number and acid number, and the quantity of component (a5) being less than 5% by weight, based on the overall weight of the monomers employed in preparing the polyacrylate resin.

The present invention also relates to processes for the production of a multilayer protective and/or decorative coating on a substrate surface and to the use of the coating compositions in the area of automotive refinishing.

It is surprising and was not foreseeable that the coating compositions according to the invention have a very good masking and solvent resistance without any impairment of the topcoat appearance relative to conventional coating compositions. Furthermore, the coating compositions according to the invention have the advantage that they are of good surface slip and good hardness. A further advantage is the improved weathering resistance of the coating compositions.

In the following text, the individual constituents of the coating compositions according to the invention will first be explained in more detail.

Before the preparation of the polyacrylate resins which are to be employed in accordance with the invention is described in more detail, two terminological explanations are given in advance:

1. As an abbreviation for "methacrylic acid or acrylic acid", (meth)acrylic acid is occasionally used.
2. The formulation "essentially carboxyl-free" is intended to denote that components (a1), (a2), (a3), (a5), (a6) and (a7) may have a low content of carboxyl groups (but no more than the level required for a polyacrylate resin prepared from these components to have an acid number of not more than 10 mg of KOH/g). However, it is preferred that the carboxyl group content of components (a1), (a2), (a3), (a5), (a6) and (a7) be kept as low as possible. Particular preference is given to the use of carboxyl-free components (a1), (a2), (a3), (a5), (a6) and (a7).

It is essential to the invention that the coating compositions comprise as binder a hydroxyl-containing polyacrylate resin which is modified with the polysiloxane macromonomers.

Suitable polysiloxane macromonomers for the modification of the polyacrylate resin are those having a number-average molecular weight of from 1000 to 40,000, preferably from 2000 to 10,000, and on average from 0.5 to 2.5, preferably from 0.5 to 2.0, ethylenically unsaturated double bonds per molecule, or on average from 0.5 to 2.5, preferably from 1.0 to 2.0, epoxide groups per molecule.

The quantity in which the polysiloxane macromonomer(s) (a5) is or are used for modifying the polyacrylate resins (A) is less than 5% by weight, preferably less than 3% by weight, particularly preferably from 0.1 to 1.0% by weight and with very particular preference from 0.3 to 0.7% by weight, based in each case on the overall weight of the monomers employed in preparing the polyacrylate resin (A).

The use of such polysiloxane macromonomers leads to a substantially improved masking resistance and solvent resistance of the resulting coatings.

The polyacrylate resin (A) employed in accordance with the invention is obtainable by polymerizing, in an organic solvent or solvent mixture and in the presence of at least one polymerization initiator, (a1) an essentially carboxyl-free (meth)acrylic ester which is different from (a2), (a3), (a5), (a6) and (a7) and is copolymerizable with (a2), (a3), (a4), (a5), (a6) and (a7), or a mixture of such monomers, (a2) an ethylenically unsaturated monomer which carries at least one hydroxyl group per molecule and is essentially carboxyl-free, and is copolymerizable with (a1), (a3), (a4), (a5), (a6) and (a7) and is different from (a3), or a mixture of such monomers, (a3) at least one reaction product of acrylic acid and/or methacrylic acid with the glycidyl ester of an α-branched monocarboxylic acid having 5 to 18 carbon atoms per molecule or, instead of the reaction product, an equivalent quantity of acrylic and/or methacrylic acid which then, during or after the polymerization reaction, is reacted with the glycidyl ester of an α-branched monocarboxylic acid having 5 to 18 carbon atoms per molecule, (a4) if desired, an ethylenically unsaturated monomer which carries at least one carboxyl group per molecule and is copolymerizable with (a1), (a2), (a3), (a5), (a6) and (a7), or a mixture of such monomers, (a5) a polysiloxane macromonomer having a number-average molecular weight of from 1000 to 40,000 and on average from 0.5 to 2.5 ethylenically unsaturated double bonds per molecule or having on average from 0.5 to 2.5 epoxide groups per molecule, or a mixture of such monomers, (a6) an aromatic vinyl hydrocarbon, or a mixture of such monomers, and (a7) if desired, an essentially carboxyl-free, ethylenically unsaturated monomer which is copolymerizable with (a1), (a2), (a3), (a4), (a5) and (a6) and is different from (a1), (a2), (a3), (a5) and (a6), or a mixture of such monomers, the nature and quantity of (a1), (a2), (a3), (a4), (a5), (a6) and (a7) being selected such that the polyacrylate resin (A) has the desired OH number and acid number, and the quantity of component (a5) being less than 5% by weight, based on the overall weight of the monomers employed in preparing the polyacrylate resin.

In preparing the polyacrylate resins to be employed in accordance with the invention, it is possible as component (a1) to employ any essentially carboxyl-free ester of (meth) acrylic acid which is copolymerizable with (a2), (a3), (a4), (a5), (a6) and (a7), or a mixture of such (meth)acrylic esters. Examples are alkyl acrylates and alkyl methacrylates having up to 20 carbon atoms in the alkyl radical, for example methyl, ethyl, propyl, butyl, hexyl, ethylhexyl, stearyl and lauryl acrylate and methacrylate. It is preferred to employ as component (a1) mixtures of alkyl acrylates and/or alkyl methacrylates which consist to the extent of at least 20% by weight of n-butyl and/or t-butyl acrylate and/or n-butyl and/or t-butyl methacrylate.

As component (a1) it is also possible to employ ethyltriglycol (meth)acrylate and methoxyoligoglycol (meth)acrylate having a number-average molecular weight of preferably 550, or other ethoxylated and/or propoxylated hydroxyl-free (meth)acrylic acid derivatives.

As component (a2) it is possible to employ ethylenically unsaturated monomers which carry at least one hydroxyl group per molecule and are essentially carboxyl-free, and which are copolymerizable with (a1), (a3), (a4), (a5), (a6) and (a7) and are different from (a3), or a mixture of such monomers. Examples are hydroxyalkyl esters of acrylic acid, methacrylic acid or of another $\alpha,\beta$-ethylenically unsaturated carboxylic acid. These esters may be derived from an alkylene glycol which is esterified with the acid, or can be obtained by reacting the acid with an alkylene oxide. As component (a2) it is preferred to employ hydroxyalkyl esters of acrylic acid or methacrylic acid in which the hydroxyalkyl group contains up to 20 carbon atoms, reaction products of cyclic esters, for example $\epsilon$-caprolactone and these [sic] hydroxyalkyl esters, or mixtures of these hydroxyalkyl esters and/or $\epsilon$-caprolactone-modified hydroxyalkyl esters.

Examples of such hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate, hydroxystearyl acrylate and hydroxystearyl methacrylate. Corresponding esters of other unsaturated acids, for example ethacrylic acid, crotonic acid and similar acids having up to about 6 carbon atoms per molecule, can also be employed.

Furthermore, it is also possible to employ, as component (a2), olefinically unsaturated polyols. Thus as component (a2) it is possible to employ, at least in part, trimethylolpropane monoallyl ether. In this case the proportion of trimethylolpropane monoallyl ether is customarily from 2 to 10% by weight, based on the overall weight of the monomers (a1) to (a7) employed in preparing the polyacrylate resin. In addition, however, it is also possible to add from 2 to 10% by weight, based on the overall weight of the monomers employed in preparing the polyacrylate resin, of trimethylolpropane monoallyl ether to the finished polyacrylate resin. The olefinically unsaturated polyols, such as, in particular, trimethylolpropane monoallyl ether, can be employed as sole hydroxyl-containing monomers (a2), but are in particular employed proportionately in combination with other of the hydroxyl-containing monomers (a2) mentioned.

As component (a3), use is made of the reaction product of acrylic acid and/or methacrylic acid with the glycidyl ester of an $\alpha$-branched monocarboxylic acid having 5 to 18 carbon atoms per molecule. Glycidyl esters of highly branched monocarboxylic acids are obtainable under the tradename "Cardura". The reaction of the acrylic or methacrylic acid with the glycidyl ester of a carboxylic acid having a tertiary $\alpha$ carbon atom can be carried out prior to, during or after the polymerization reaction. The component (a3) employed is preferably the reaction product of acrylic and/or methacrylic acid with the glycidyl ester of Versatic acid. This glycidyl ester is commercially obtainable under the name "Cardura E10".

As component (a4) it is possible to employ any ethylenically unsaturated monomer which carries at least one carboxyl group per molecule and is copolymerizable with (a1), (a2), (a3), (a5), (a6) and (a7), or a mixture of such monomers. Preference is given to the employment, as component (a4), of acrylic acid and/or methacrylic acid. However, it is also possible to employ other ethylenically unsaturated acids having up to 6 carbon atoms in the molecule. Examples of such acids are ethacrylic acid, crotonic acid, maleic acid, fumaric acid and itaconic acid. As component (a4) it is also possible to employ mono(meth)acryloyloxyethyl maleate, mono(meth)acryloyloxyethyl succinate and mono(meth)acryloyloxyethyl phthalate.

Compounds suitable as component (a5) are polysiloxane macromonomers having a number-average molecular weight of from 1000 to 40,000, preferably from 2000 to 10,000, and on average from 0.5 to 2.5, preferably from 0.5 to 2.0, ethylenically unsaturated double bonds per molecule or on average from 0.5 to 2.5, preferably from 1.0 to 2.0, epoxide groups per molecule.

Examples of suitable polysiloxane macromonomers are those described in DE-A 38 07 571 on pages 5 to 7, those described in DE-A 37 06 095 in columns 3 to 7, those described in EP-B 358 153 on pages 3 to 6 and those described in U.S. Pat. No. 4,754,014 in columns 5 to 9. Also suitable, furthermore, are other acryloxysilane-containing vinyl monomers having the abovementioned molecular weights and contents of ethylenically unsaturated double bonds, for example compounds which can be prepared by reacting hydroxy-functional silanes with epichlorohydrin and then reacting the reaction product with methacrylic acid and/or with hydroxyalkyl esters of (meth)acrylic acid.

The compounds preferably employed as component (a5) are polysiloxane macromonomers of the following formula:

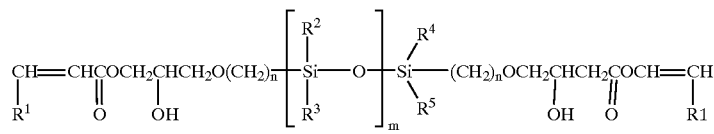

where

R$^1$=H or CH$_3$

R$_2$, R$_3$, R$_4$, R$_5$=identical or different aliphatic hydrocarbon radicals having 1 to 8 carbon atoms, especially methyl, or phenyl radical.

n=from 2 to 5, preferably 3 m=from 8 to 80

One example of such a polysiloxane macromonomer is the $\alpha,\omega$-acryloxy-organofunctional polydimethyl-siloxane of the formula

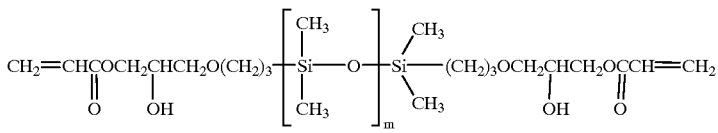

where m≈from 30 to 50.

As polysiloxane macromonomer it is particularly preferred to employ an acryloxy-organofunctional siloxane having an acryloxy functionality<2. An example is a polysiloxane of the following formula:

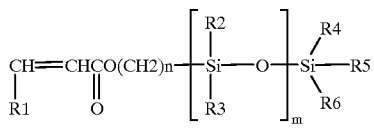

in which m≈8 to 80 and n=from 1 to 5 and R1 is hydrogen or a methyl group, R2 and R3 are identical or different aliphatic hydrocarbon radicals having 1 to 8 carbon atoms, especially methyl, or a phenyl radical and R4, R5 and R6 are a halogen radical or an alkoxy radical having 1 to 4 carbon atoms, or are a hydroxyl group.

As component (a5) it is also preferred to employ polysiloxane macromonomers which have been prepared by reacting from 70 to 99.999 mol % of a compound (1) represented by the formula (I)

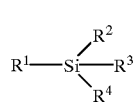

in which $R^1$ is an aliphatic hydrocarbon group having 1 to 8 carbon atoms or a phenyl radical and $R^2$, $R^3$ and $R^4$ are each a halogen radical or an alkoxy radical having 1 to 4 carbon atoms, or are a hydroxyl group, with from 30 to 0.001 mol % of a compound (2) represented by the formula (II)

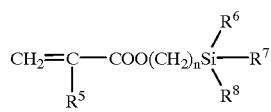

in which $R^5$ is a hydrogen atom or a methyl radical, $R^6$, $R^7$ and $R^8$ are each halogen, OH— or an alkoxy radical having 1 to 4 carbon atoms, or are an aliphatic hydrocarbon group having 1 to 8 carbon atoms, at least one of the radicals $R^6$, $R^7$ or $R^8$ being OH— or an alkoxy group and n being an integer from 1 to 6.

Examples of suitable compounds (1) and (2) are listed in WO 92/22615 on page 13, line 18 to page 15, line 9.

The reaction between the compounds (1) and (2) is brought about by the dehydrating condensation of the hydroxyl groups which are present in these compounds and/or of the hydroxyl groups which originate from the hydrolysis of the alkoxy groups of these compounds. Depending on the reaction conditions, the reaction comprises in addition to the dehydrating reaction a dealcoholizing condensation. If the compounds (1) or (2) contain halogen radicals, the reaction between (1) and (2) is effected by dehydrohalogenation.

The conditions under which the reaction between the compound (1) and the compound (2) is carried out are likewise described in the international patent application having the international publication number WO 92/22615 on page 15, line 23 to page 18, line 10.

Particular preference is given to the employment, as component (a5), of the polysiloxane macromonomer which is commercially obtainable under the designation AK 5 from the company Toagosei Chemical Industries Co., Ltd. (represented in Germany by the company Marubeni), having from 0.5 to 1.5, on average having one methacryloyl end group and having a number-average molecular weight of 5000.

Also suitable, furthermore, are epoxy-functional polysiloxane macromonomers of the following formula:

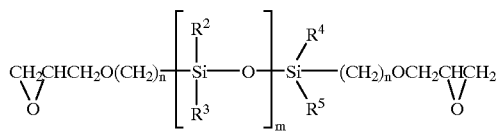

where
$R^2$, $R^3$, $R^4$, $R^5$=identical or different aliphatic hydrocarbon radicals having 1 to 8 carbon atoms, especially methyl, or phenyl radical.
n=from 2 to 5, preferably 3
m=from 8 to 80.

Particular preference is given to the epoxy-functional polydimethylsiloxane of the formula

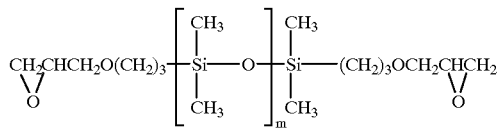

where m=50, having an epoxy equivalent weight of 1900. This polysiloxane macromonomer is obtainable commercially, for example, under the designation Versuchsprodukt TEGOMER® E-Si 2530 from the company Th. Goldschmidt.

Other compounds suitable as component (a5) are the products obtainable commercially under the following names: Polysiloxanmakromonomer AK 30 from the company Toagosei Chemical Industries Co., Ltd. (represented in Germany by the company Marubeni) and various products sold under the designations TEGOMER® E-Si and TEGOMER® V-Si by the company Th. Goldschmidt.

Aromatic vinyl hydrocarbons are employed as component (a6), such as sytrene, α-alkylstyrenes, such as α-methylstyrenes, chlorostyrenes, o-, m- and p-methylstyrene, 2,5-dimethylstyrene, p-methoxystyrene, p-tert-butylstyrene, p-dimethylaminostyrene, p-acetamidostyrene and vinyltoluene, with preference being given to the employment of vinyltoluenes and, in particular, of styrene.

As component (a7) it is possible to employ all essentially carboxyl-free, ethylenically unsaturated monomers which are copolymerizable with (a1), (a2), (a3), (a4), (a5) and (a6) and are different from (a1), (a2), (a3), (a5) and (a6), or mixtures of such monomers. As component (a7) it is preferred to employ alkoxyalkyl acrylates and methacrylates, mono- and polycyclic aliphatic esters of methacrylic acid and/or acrylic acid, preferably cyclohexyl acrylate, cyclohexyl methacrylate, 4-tert-butylcyclohexyl acrylate, 4-tert-butylcyclohexyl methacrylate, isobornyl acrylate and isobornyl methacrylate, especially 4-tert-butylcyclohexyl acrylate and/or 4-tert-butylcyclohexyl methacrylate, vinyl esters and also alkyl esters of ethylenically unsaturated carboxylic acids, with the exception of alkyl esters of acrylic and methacrylic acid, such as, for example, alkyl esters of crotonic, isocrotonic and maleic acid.

Acrylate resins which are employed with particular preference are obtained by polymerizing a1) from 5 to 74% by weight, preferably from 5 to 30% by weight, of component (a1), (a2) from 10 to 40% by weight, preferably from 15 to 25% by weight, of component (a2), (a3) from 10 to 50% by weight, preferably from 15 to 40% by weight, of component (a3), (a4) from 0 to 10% by weight, preferably from 0.1 to 6% by weight, of component (a4), (a5) less than 5% by weight, preferably less than 3% by weight, particularly preferably from 0.1 to 1% by weight and with very particular preference from 0.3 to 0.7% by weight of component (a5), (a6) from 5 to 40% by weight, preferably from 10 to 30% by weight, of component (a6) and (a7) from 0 to 40% by weight, preferably from 0 to 30% by weight, of component (a7), the sum of the proportions by weight of components (a1) to (a7) being in each case 100% by weight.

The polyacrylate resins (A) employed in accordance with the invention customarily have an OH number of from 60 to 200, preferably from 100 to 160 mg of KOH/g, an acid number of from 1 to 60, preferably from 1 to 15 mg of KOH/g and a number-average molecular weight of from 1000 to 5000, preferably from 1500 to 4000, determined in each case by gel permeation chromatography against a polystyrene standard.

The polyacrylate resins (A) employed in accordance with the invention are prepared in an organic solvent or solvent mixture and in the presence of at least one polymerization initiator. The organic solvents and polymerization initiators employed are those solvents and polymerization initiators which are customary for the preparation of polyacrylate resins. Examples of solvents which can be used are Solvent Naphtha®, heavy benzene, various Solvesso® grades, various Shellsol® grades and Deasol®, and also relatively high-boiling aliphatic and cycloaliphatic hydrocarbons, for example various white spirits, mineral terpentine oil, tetralin and decalin, and various alcohols, ethers and esters, for example butylglycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, ethyl 2-hydroxypropionate and 3-methyl-3-methoxybutanol, and derivatives based on propylene glycol, for example ethyl ethoxypropionate, methoxypropyl acetate and the like.

Examples of polymerization initiators which can be used are initiators which form free radicals, for example t-butyl perethylhexanoate, benzoyl peroxide, azobisisobutyronitrile and t-butyl perbenzoate. The polymerization is advantageously carried out at a temperature of from 80 to 200° C., preferably from 110 to 160° C. Preferred solvents employed are Shellsol® A, Solvent Naphtha® and butyl acetate.

For preparing the polyacrylate resin (A) it is preferred to add at least 60% by weight, particularly preferably 100% by weight, of the overall quantity of component (a3) to the initial charge, together with a portion of the solvent, and to heat this charge to the respective polymerization temperature. The other monomers are then metered in at a uniform rate at the polymerization temperature. Where polysiloxane macromonomers of low reactivity are employed as component (a5) (functionality<2), then likewise preferably at least 60% by weight, particularly preferably 100% by weight, of the overall quantity of this polysiloxane macromonomer (a5) is added to the initial charge. If, on the other hand, polysiloxane macromonomers (a5) of higher reactivity are employed (functionality>2), then these polysiloxane macromonomers are preferably added together with the other monomers.

This specific polymerization technique presumably promotes the copolymerization and reduces the homopolymerization of the individual components. In addition, copolymers having a very low residual monomer content are obtained, which give clear solutions of high solids content.

The polyisocyanate component (B) comprises any desired organic polyisocyanates having free isocyanate groups which are attached to aliphatic, cycloaliphatic, aralihatic and/or aromatic structures. Preference is given to the employment of polyisocyanates having from 2 to 5 isocyanate groups per molecule. If desired, small quantities of organic solvent, preferably from 1 to 25% by eight based on pure polyisocyanate, can be added to the olyisocyanates in order to improve the ease of incorporation of the isocyanate. Examples of solvents suitable as additives for the polyisocyanates are ethoxyethyl propionate, butyl acetate and the like.

Examples of suitable isocyanates are described, for example, in "Methoden der organischen Chemie" [Methods of organic chemistry], Houben-Weyl, Volume 14/2, 4th edition, Georg Thieme Verlag, Stuttgart 1963, page 61 to 70, and by W. Siefken, Liebigs Ann. Chem. 562, 75 to 136. Suitable examples are 1,2-ethylene diisocyanate, 1, 4-tetramethylene diisocyanate, 1,6-hexamethylene diisocyanate, 2,2,4- or 2,4,4-trimethyl-1,6-hexamethylene diisocyanate, 1,12-dodecane diisocyanate, ω,ω'-diisocyanatodipropyl ether, cyclobutane 1,3-diisocyanate, cyclohexane 1,3- and 1,4-diisocyanate, 2,2- and 2,6-diisocyanato-1-methylcyclohexane, 3-isocyanatomethyl-3, 5,5-trimethylcyclohexyl isocyanate ("isophorone diisoyanate" [sic]), 2,5- and 3,5-bis(isocyanatomethyl)-8-methyl-1, 4-methano-decahydronaphthalene, 1,5-, 2,5-, 1,6- and 2,6-bis(isocyanatomethyl)-4,7-methanohexahydroindane, 1,5-, 2,5-, 1,6- and 2,6-bis (isocyanato) -4,7-methanehexahydroindane, dicyclohexyl 2,4'- and 4,4'-diisocyanate, 2,4- and 2,6-hexahydrotolylene diisocyanate, perhydro-2,4'- and -4,4'-diphenylmethane diisocyanate, ω,ω-diisocyanato-1,4-diethylbenzene, 1,3- and 1,4-phenylene diisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenylbiphenyl, 2,4'- and 4,4'-diisocyanato-diphenylmethane, naphthylene 1,5-diisocyanate, tolylene diisocyanates, such as 2,4- and/or 2,6-tolylene diisocyanate, N,N'-(4,4'-dimethyl-3,3'-diisocyanatodiphenyl)uretdione, m-xylylene diisocyanate, dicyclohexylmethane diisocyanate, tetramethylxylylene diisocyanate, and also triisocyanates, such as 2,4,4'-triisocyanatodiphenyl ether, 4,4',4"-triisocyanatotriphenylmethane. Preference is given to the use, if desired in combination with the abovementioned isocyanates, of polyisocyanates containing isocyanurate groups and/or biuret groups and/or allophanate groups and/or uretdione groups and/or urethane groups and/or urea groups. Polyisocyanates containing urethane groups, for example, are obtained by reacting a portion of the isocyanate groups with polyols, for example trimethylolpropane and glycerol.

Preference is given to the use of aliphatic or cycloaliphatic polyisocyanates, especially hexamethylene diisocyanate, dimerized and trimerized hexamethylene diisocyanate, isophorone diisocyanate, dicyclohexylmethane 2,4'-diisocyanate or dicyclohexylmethane 4,4'-diisocyanate, or mixtures of these polyisocyanates. Very particular preference is given to the use of mixtures of polyisocyanates based on hexamethylene diisocyanate which contain uretdione and/or isocyanurate groups and/or allophanate groups, such mixtures being as obtained by catalytic oligomerization of hexamethylene diisocyanate using appropriate catalysts. The polyisocyanate component (B) can, moreover, also consist of any desired mixtures of the polyisocyanates mentioned by way of example.

The quantity of crosslinking agent employed is chosen such that the ratio of the isocyanate groups of the crosslinking agent to the hydroxyl groups of component (A) lies within the range from 1:3 to 3:1. The coating compositions according to the invention customarily contain from 15 to 45% by weight of the acrylate resin (A) and from 6 to 20% by weight of the crosslinking agent (B), based in each case on the overall weight of the coating composition and based on the solids content of components (A) and (B).

The coating compositions according to the invention can if desired contain one or more other hydroxyl-containing, polyester-modified polyacrylate resins, whereby further improvements are brought about in, for example, the solvent resistance and the hardness of the resulting coating. These polyester-modified polyacrylate resins (C) are customarily employed in a quantity of from 0 to 50% by weight, preferably from 20 to 45% by weight, based in each case on the overall weight of the coating composition and based on the solids content of the binder. Compounds which may be mentioned as an example of such polyester-modified polyacrylate resins (C) are the hydroxyl-containing polyacrylate resins (C) described in German Patent Application DE-A-40 24 204, which are prepared in the presence of a polyester. For details, reference may be made to DE-A-40 24 204, especially page 3, lines 18 to page 7, line 53. Also suitable are other polyester-modified polyacrylate resins (C), which have been prepared in the presence of polyesters based on customary di- and polycarboxylic acids, di- and polyols and also, if desired, customary monocarboxylic acids and/or customary monools, but especially polyester-modified polyacrylate resins which, based on the respective resin, consist of from 20 to 60% by weight of at least one polyester and from 40 to 80% by weight of at least one hydroxyl-containing polyacrylate, at least a proportion of the polyacrylates having been prepared in the presence of the polyesters, the polyesters having an OH number of from 90 to 130 mg of KOH/g, an acid number of less than 10 mg of KOH/g, a number-average molecular weight of from 1300 to 3500 and a polydispersity or nonuniformity of the molecular weight of from 5 to 50, and the polyacrylates containing hydroxyethyl methacrylate and/or 4- and/or 3-hydroxy-n-butyl (meth)acrylate in copolymerized form and having an OH number of from 50 to 150 mg of KOH/g and an acid number of from 0 to 10 mg of KOH/g.

The coating compositions according to the invention may also, if desired, contain one or more other hydroxyl-containing resins, by means of which further improvements are brought about in, for example, the solvent resistance and the hardness of the resulting coating. For example, they may contain other hydroxyl-containing acrylate resins, which are different from the above-described acrylate resin (A), and/or polycondensation resins (especially polyesters).

These additional binders are customarily employed in a quantity of from 0 up to 20% by weight, based in each case on the overall weight of the coating composition and based on the solids content of the binder.

Examples of such additional binders which are suitable are, for example, the polyacrylate resins commercially obtainable under the name Macrynal® SM 510 and SM 513 from the company Hoechst.

The coating compositions according to the invention also contain one or more organic solvents. These solvents are customarily employed in quantities of from 20 to 70% by weight, preferably from 25 to 65% by weight, based in each case on the overall weight of the coating composition.

Examples of suitable solvents are relatively highly substituted aromatics, for example Solvent Naphtha®, heavy benzene, various Solvesso® grades, various Shellsol® grades and Deasol®, and also relatively high-boiling aliphatic and cycloaliphatic hydrocarbons, for example various white spirits, mineral terpentine oil, tetralin and decalin, and various esters, for example ethylglycol acetate, butylglycol acetate, ethyldiglycol acetate, and so on.

If desired, the coating compositions according to the invention can also contain customary pigments and/or fillers in customary quantities. In this case the fillers and/or pigments are preferably employed in a quantity of from 0 to 40% by weight, based on the overall weight of the coating composition.

The coating compositions according to the invention can additionally contain customary auxiliaries and additives in customary quantities, preferably from 0.01 to 10% by weight, based on the overall weight of the coating composition. Examples of suitable auxiliaries and additives are leveling agents, such as silicone oils, plasticizers, such as phosfates and phthalates, viscosity-controling additives, matting agents, UV absorbers, light stabilizers and, if desired, fillers.

The coating compositions are prepared in a known manner by mixing and, if desired, dispersing the individual components.

These coating compositions can be applied by spraying, flow-coating, dipping, rolling, knife-coating or brushing to a substrate, in the form of a film which is subsequently cured to give a firmly adhering coating.

These coating compositions are fully cured, customarily at room temperature or slightly elevated temperature, preferably at slightly elevated temperature, advantageously at temperatures below 120° C., preferably at temperatures below 80° C. and preferably at temperatures above 60° C. The coating compositions can, however, also be cured under baking conditions, i.e. at temperatures of at least 120° C.

Particularly suitable substrates are metals and also wood, plastic, glass and so on.

Owing to the short curing times and low curing temperatures, the coating compositions according to the invention are preferably used for automotive refinishing, the finishing of large vehicles and truck bodies. However, depending on the crosslinking agent employed, they can also be employed for production-line automotive finishing.

Furthermore, they are suitable as a clearcoat and, in particular, as a pigmented topcoat.

The present invention therefore additionally relates to a process for the production of a multilayer protective and/or decorative coating on a substrate surface, in which (1) a pigmented basecoat is applied to the substrate surface, (2) a polymer film is formed from the basecoat applied in step (1), (3) a transparent topcoat comprising
   (A) a hydroxyl-containing polyacrylate resin and
   (B) a crosslinking agent is applied to the basecoat thus obtained, and subsequently (4) basecoat and topcoat are cured together, characterized in that the topcoat employed is the coating composition according to the invention.

The basecoats employed in this process are known and therefore require no more detailed description. Examples of suitable basecoats are also the basecoats described in DE-A 41 10 520, DE-A 40 09 000, DE-A-40 24 204, EP-A-355433, DE-A 35 45 618, DE-A 38 13 866 and the German Patent Application P 42 32 717.2, which is not a prior publication.

Other suitable basecoats are those described in the non-prior-published German Patent Application P 43 27 416.1, which are characterized in that they contain a hydroxyl-containing polyester having a weight-average molecular weight Mw from 40,000–200,000 and a polydispersity Mw/Mn>8 and in that, for the preparation of the polyester, at least 50% by weight of aromatic dicarboxylic acids or esterifiable derivatives thereof have been employed, but where the content of phthalic anhydride is not more than 80% by weight and where the percentages by weight are based in each case on the overall weight of the acid components employed in preparing the polyester.

Using the coating composition according to the invention it is also possible to provide a coating over oxidatively drying, pigmented oxidatively drying, and pigmented 2-component polyurethane coating materials which are customarily employed in the area of automotive refinishing, optionally single-layer automotive refinishing. In this case too, coatings having the desired advantageous properties are obtained.

In the examples which follow the invention is illustrated in more detail. All parts and percentages are by weight unless expressly stated otherwise.

I.1. Preparation of the Hydroxyl-containing Acrylate Resins E1 to E3 and V1

The acrylate copolymers were each prepared in a 4 liter stainless steel polymerization vessel with stirrer, reflux condenser, a monomer feed and an initiator feed. The components indicated in each case in Table 1 are weighed in and the initial charge is then heated to 145° C.

The addition of all feeds is commenced simultaneously, with the monomer feed being metered in at a uniform rate over a period of 4 h and the initiator feed being metered in at a uniform rate over a period of 4.5 h. The initiator feed ends 30 minutes after the end of the monomer feed. During the polymerization, the temperature in the vessel is maintained at 142–145° C. Thereafter, post-polymerization is carried out for 2 h more. The alkylate resin solution thus obtained has a solids content of 70%. The temperature is then lowered to 120° C. and the acrylate resin is diluted with the stated solvent mixture to a solids content of 54%.

The respective quantities indicated in Table 1 of Shellsol A® (commercial aromatic solvent mixture with a boiling range from 165 to 185° C., from the company Shell Chemie), the respective quantity of siloxane monomer indicated in Table 1 and the quantity indicated in Table 1 of the commercially available glycidyl ester of Versatic acid (commercial product Cardura E 10® from the company Shell Chemie) are weighed into the initial charge. The respective quantities indicated in Table 1 of methyl methacrylate, styrene, OH monomer, acrylic acid and mercaptoethanol are weighed into the monomer feed.

The quantities indicated in Table 1 of di-tert-butyl peroxide and xylene are weighed into the initiator feed.

The solvent mixture employed for diluting the acrylate resin has the following composition:
   334 parts of xylene
   1429 parts of butyl acetate
   60 parts of Butoxyl (commercial solvent from the company [lacuna] acetate of 2-methoxybutanol-128 parts of butylglycol acetate I.2. Preparation of the Hydroxyl-containing Acrylate Resin V2

The preparation of the hydroxyl-containing acrylate resin V2 is similar to that of the acrylate resins E1 to E3 and V1, but with the difference that the acrylate resin solution obtained after post-polymerization has a solids content of 50±2%. The addition of the solvent mixture was therefore not necessary.

I.3. Preparation of the Hydroxyl-containing Acrylate Resin V3

The acrylate copolymer V3 was prepared in each case in a 4 liter stainless steel polymerization vessel with stirrer, reflux condenser, a monomer feed and an initiator feed. The components indicated in each case are weighed in and then the initial charge is heated to 110° C.

The addition of all feeds is commenced simultaneously; the monomer feed is metered in uniformly over the course of 3 h; the initiator feed is metered in uniformly over the course of 3.5 h. The initiator feed ends 30 minutes after the end of the monomer feed. During the polymerization, the temperature in the vessel is maintained at 110° C. Subsequently, post-polymerization is carried out for 2 h more. The acrylate resin solution thus obtained has a solids content of 50±2%.

The polyacrylate resin obtained in this way has a solids content of 51.2%, an acid number of 9.6 g of KOH/g, a viscosity of 60 dPas (original) and a hydroxyl number of about 128.

Initial Charge
   955.5 parts of xylene
   409.5 parts of butyl acetate
Monomer Feed A
   37.7 parts of Siloxanmakromonomer AK 5® (product of Marubeni) (40% strength in methyl ethyl ketone/toluene)
   615 parts of methyl methacrylate
   225 part of hydroxyethyl methacrylate
   630 parts of n-butyl methacrylate
   15 parts of acrylic acid
Initiator Feed
   37.5 parts of tert-butyl cumyl peroxide
   150 parts of xylene I.4. Preparation of a Polyester-modified Acrylate Resin 796 parts of trimethylolpropane, 540 parts of isononanoic acid, 821 parts of phthalic anhydride and 83 parts of xylene are placed in a 4 liter polycondensation vessel with stirrer, steam-heated column and water separator, and the mixture is slowly heated.

Condensation is carried out at a temperature of max. 190° C. to an acid number of 15 mg of KOH/g and a viscosity of 5.3 dPas (60% strength in xylene). The mixture is then cooled and diluted at 130° C. with 910 parts of Shellsol® A, and cooled further to room temperature.

The resulting polyester has a solids content of 66.5%, an acid number of 13 mg of KOH/g, a (theoretical) OH number of 104 mg of KOH/g and a viscosity of 22 dpas (original). The number-average molecular weight Mn is 1,241, the weight-average molecular weight Mw is 5,843 and the polydispersity Mw/Mn is 4.71 (each determined by gel permeation chromatography against a polystyrene standard).

The acrylate copolymer was prepared in a 4 liter stainless steel polymerization vessel with stirrer, reflux condenser, a monomer feed and an initiator feed. The components indicated below are weighed into the initial charge, which is then heated to 165° C.

The addition of all feeds is commenced simultaneously, with the monomer feed being metered in uniformly over a period of 4 h and the initiator feed being metered in uniformly over a period of 5 h. During the polymerization, the temperature in the vessel is maintained at 160–165° C. Subsequently, post-polymerization is carried out for 2 h more. The acrylate resin solution thus obtained has a solids content of 80%. The temperature is then reduced to 120° C. and the acrylate resin is diluted with butyl acetate to a solids content of 65%.

Initial Charge 700 parts of the above-described polyester resin 70 parts of a commercial vinyl ester of Versatic acid (commercial product VeoVa 10® from the company Shell Chemie)

Monomer Feed 350 parts of styrene 140 parts of hydroxyethyl methacrylate and 140 parts of methyl methacrylate Initiator Feed 14 parts of di-tert-butyl peroxide, 44 parts of Shellsol® A (commercial aromatic solvent mixture with a boiling range from 165 to 185° C.) and 25 parts of xylene

II. Preparation of the Coating compositions E1 to E3 and V1 to V3 (Comparison Examples)

II.1. Preparation of the Curing Agent Solution

The curing agent solutions were prepared from the components indicated below by mixing:

4 parts of catalyst solution[1]

50.6 parts of Desmodur® N 3390[2]

10.0 parts of Solventnaphta®

7.5 parts of xylene 1.5 parts of n-butyl acetate 98/100

0.6 part of Baysilon® coating additive OL44[3]

14.0 parts of 1-methoxypropyl 2-acetate 11.0 parts of butylglycol acetate

[1] catalyst solution described under Section II.3. [2] Commercial polyisocyanate from the company Bayer AG, a 90% strength solution in butyl acetate/solvent naphtha 1:1 of a trimer based on hexamethylene diisocyanate having a number-average molecular weight of about 700, an average functionality of between 3 and 4 and a uretdione group content of not more than 5%; [3] commercial leveling agent based on a polyether-modified methylpolysiloxane from the company Bayer AG II.2 Preparation of a Standardizing Additive A standardizing additive is prepared from the components indicated below by mixing:

| | |
|---|---|
| xylene | 15.0 parts |
| Solventnaphta ® | 13.0 parts |
| petroleum spirit 135/180 | 10.0 parts |
| butylgycol [sic] acetate | 3.0 parts |
| n-butyl acetate 98/100 | 50.0 parts |
| 1-methoxypropyl 2-acetate | 5.0 parts |
| Butoxyl | 2.0 parts |
| dipentenes | 2.0 parts |

II.3. Preparation of a Catalyst Solution 1.0 part of dibutyltin dilaurate is mixed with 50 parts of butyl acetate 98/100 and 49 parts of xylene.

II.4. Preparation of the Topcoats E1 to E3 and V1 to V3

The topcoats are prepared by initially charging 40 parts of the above-described solution of the polyester-modified polyacrylate resin and 3 parts of butyl acetate 98/100 and adding 6 parts of a commercial organic red pigment (commercial product Novopermrot® F2RK 70 from the company Hoechst). The water is first of all processed in a dissolver for 10 minutes at 2000 revolutions/minute and then, with cooling, is ground for 180 minutes at 4000 revolutions/minute to a Hegmann particle fineness of <10 μm. Thereafter, a mixture of 4 parts of butyl acetate 98/100, 20 parts of the above-described hydroxyl-containing acrylate resin E1 to E3 or V1 to V3, 0.5 part of a commercial light stabilizer based on a sterically hindered amine (commercial product Tinuvin 292 from the company Ciba Geigy), 0.5 part of the above-described catalyst solution and 26 parts of the above-described solution of the polyester-modified polyacrylate resin are added and this mixture is homogenized with a stirrer (1000 revolutions/minute).

To prepare the topcoats, in each case 4 parts by volume of the mixture thus obtained are mixed with 1 part by volume of the above-described curing agent solution and 1 part by volume of the above-described standardizing additive.

II.5. Application of the Topcoats

The topcoat thus obtained is then, after a rest period of at least 16 h, applied to phosfatized and filler-treated steel panels. For this purpose the phosfatized steel panels are coated with a conventional commercial filler (commercial product Glasurit Grundfuller 283-1874 from the company Glasurit GmbH, Munster) based on an epoxide group-containing binder and on an amino-functional curing agent, and are initially dried at room temperature for 1 h. The topcoat is then applied in two spray passes with a flash-off time of 15 minutes in between and the coated panels are dried at 20° C. for 16 h. The dry-film thickness is from 50 to 60 μm.

The panels coated in this way are then subjected to various tests. The test results are shown in Table 3.

II.6 Preparation of Clearcoats

The binders according to the invention have also been employed in clearcoat coating systems.

TABLE 1

Composition of the initial charge used to prepare the acrylate resin and of the monomer feed and initiator feed, in parts by weight

| | V1 | 1 | 2 | 3 | V2 | V3 |
|---|---|---|---|---|---|---|
| Initial charge: | | | | | | |
| Shellsol A | 1585 | 1537.75 | 1558 | 1585 | 1000 | — |
| BuAc | — | — | — | — | 408.5 | 409.5 |
| xylene | — | — | — | — | — | 955.5 |

TABLE 1-continued

Composition of the initial charge used to prepare the acrylate resin and of the monomer feed and initiator feed, in parts by weight

|  | V1 | 1 | 2 | 3 | V2 | V3 |
|---|---|---|---|---|---|---|
| AK5 | — | 78.75 | 45 | — | 26.75 | — |
| TEGOMER | — | — | — | 15.75 | — | — |
| Cardura | 1125 | 1125 | 1125 | 1125 | — | — |
| Monomers |  |  |  |  |  |  |
| AK 5 | — | — | — | — | — | 37.7 |
| MMA | 900 | 900 | 900 | 900 | 414 | 615 |
| styrene | 1350 | 1318.5 | 1332 | 1334.25 | 585 | — |
| HEMA | 765 | 765 | 765 | 765 | 300 | 225 |
| HPMA | — | — | — | — | 180 | — |
| n-BuMA | — | — | — | — | — | 630 |
| AA | 360 | 360 | 360 | 369 | 10.5 | 15 |
| mercapt. | 22.5 | 22.5 | 22.5 | 22.5 | 7.5 | — |
| initiator |  |  |  |  |  |  |
| TBCP | 99 | 99 | 99 | 99 | 33 | 37.5 |
| xylene | 396 | 396 | 396 | 396 | 132 | 150 |

Key to Table 1

Cardura® E 10=commercial glycidyl ester of Versatic acid

AK 5=Commercial product Siloxanmakromonomer AK 5 from the company Marubeni, an α,ω-acryloxy-organofunctional polysiloxane macromonomer having from 0.5 to 1.5, on average having one methacryloyl end group and having a number-average molecular weight of 5000.

TEGOMER®=TEGOMER® E-Si 2530 from the company Th. Goldschmidt, commercial α,ω-glycidylorganofunctional polydimethylsiloxane of the formula $$CH_2CHCH_2O(CH_2)_3-\begin{bmatrix}CH^3\\|\\Si\\|\\CH3\end{bmatrix}-O-\begin{bmatrix}CH3\\|\\Si\\|\\CH3\end{bmatrix}_m-(CH_2)_3OCH_2CHCH_2$$
$$\underset{O}{\backslash/} \qquad \qquad \qquad \qquad \qquad \underset{O}{\backslash/}$$

Where m=50 and having an epoxy equivalent weight of 1900
HEMA=hydroxyethyl methacrylate
HPMA=hydroxypropyl methacrylate
MMA=methyl methacrylate
AA=acrylic acid
n-BuMA=n-butyl methacrylate
BuAc=butyl acetate
mercapt.=mercaptoethanol
TBCP=tert-butyl cumyl peroxide

TABLE 2

Characteristics of the acrylate resin solutions

|  | SC (%) | AN | OHN | Visc. (dPas) |
|---|---|---|---|---|
| V1 | 54.5 | 9.6 | 125 | 8.8 (orig.) |
| 1 | 55.0 | 9.5 | 125 | 9.4 (orig.) |
| 2 | 54.6 | 9.2 | 125 | 9.3 (orig.) |
| 3 | 53.9 | 9.4 | 125 | 9.1 (orig.) |
| V2 | 51.7 | 12.0 | 128 | 32 (orig.) |
| V3 | 51.2 | 9.6 | 128 | 60 (orig.) |

TABLE 3

Test results of the resulting coatings of Examples 1 to 6 and of Comparison Examples V1 to V8

| Example | Spray mist uptake | Leveling | Solvent resistance | Masking test Tesa | Masking test Regu-Pak |
|---|---|---|---|---|---|
| V1 | 2 | 2 | 5 | 5 | 5 |
| 1 | 3 | 3–4 | 1 | 2 | 2 |
| 2 | 2 | 3 | 1–2 | 2 | 2 |
| 3 | 2 | 3 | 1–2 | 2 | 2 |
| V2 | 4 | 5 | 2 | 3 | 3 |
| V3 | 4 | 5 | 2 | 3 | 3 |

Key to Table 3
Description of the test methods to be employed:
Surface Drying Masking Test The topcoat is applied in accordance with the application instructions (2 spray passes with an intermediate flash-off time of 5 minutes, dry-film thickness: 50–60 μm) to a prepared (filler-treated) sheet steel panel (60 cm×50 cm). After drying at 120° C. for 16 h, a strip of Tesakrepp film (5 cm wide) and a "Regupak" inscription film are applied.

For a defined pressing force, the Tesakrepp strip is rolled over twice with the pressing roll and the "Regupak" film is pressed on by hand without bubbles.

One piece of Tesakrepp or film is removed after 1 h, 3 h, 6 h and 24 h and the marking on the coating surface is assessed immediately and after 60 minutes.

Evaluation

| Marking | Characteristic number according to DIN 53 230 |
|---|---|
| not marked | 0 |
| very slightly marked | 1 |
| slightly marked | 2 |
| marked | 3 |
| heavily marked | 4 |
| very heavily marked | 5 |

Leveling

Test panels are prepared see description masking test [sic] and evaluated visually.

| Leveling | Characteristic number according to DIN 53 230 |
|---|---|
| excellent | 0 |
| very good | 1 |
| good | 2 |
| moderate | 3 |
| poor | 4 |
| very poor | 5 |

Spray Mist Uptake

Use of filler-treated panels having 6 holes with a diameter of 8 mm in the central region of the panel.

After two conventionally applied spray passes, the topcoat is sprayed a third time in a wedge formation from left to right, i.e. left—thick coat applied, right—thin coat applied. After 30 minutes a spray mist is projected into the right-hand half of the panel. During spray application and drying, the panels hang vertically.

For the evaluation the filler-treated panels are located on an inclined holding device at an angle of 30°.

Evaluation of the right-hand side, visually:

| Spray mist uptake | Characteristic number according to DIN 53 230 |
|---|---|
| excellent | 0 |
| very good | 1 |
| good | 2 |
| moderate | 3 |
| poor | 4 |
| very poor | 5 |

Solvent Resistance

Test panels are prepared see description masking test [sic].

A paper towel is soaked with solvent and wiped with 10 double strokes under gentle pressure over the surface. The area is then dried with a separate cloth, and the degree of matting is assessed visually straight away.

Evaluation

| Matting | Characteristic number according to DIN 53 230 |
|---|---|
| excellent | 0 |
| very good | 1 |
| good | 2 |
| moderate | 3 |
| poor | 4 |
| very poor | 5 |

Summary of the Test Results

With the examples according to the invention and in the comparison example without siloxane modification, the spray mist uptake is acceptable; an improvement in spray mist uptake can be observed, however, as the siloxane content falls. The spray mist uptake of Comparison Examples V2 and V3 is unacceptable. From a rating >3, the leveling is no longer acceptable in practise, which excludes the coating compositions based on V2 and V3 from use. Furthermore, it can also be seen that the leveling becomes poorer as the proportion of siloxane increases. The coating composition according to the invention based on E1, despite poor leveling, can still be employed under certain conditions owing to the particularly good solvent resistance.

The solvent resistance of the coatings only meets requirements when it is assessed as being $\leq 2$. In this case, the requirements are met by all examples- with the exception of the binder V1 which was not siloxane-modified. At a rating <2, matting phenomena of the resulting coating compositions are observed.

The masking test must be regarded as the most important assessment criterion for the coatings tested. For acceptable coatings the evaluation must be $\leq 2-3$. While the coating based on V1 shows a completely inadequate masking resistance and the coatings based on Comparison Examples V2 and V3 show an inadequate masking resistance, the use of the binders according to the invention leads to a good masking resistance.

We claim:

1. An organic solvent based coating composition comprising (A) at least one hydroxyl-containing polyacrylate resin and (B) at least one isocyanate crosslinking agent, wherein the polyacrylate resin (A) is obtained by polymerizing, in an organic solvent or solvent mixture and in the presence of at least one polymerization initiator, (a1) an essentially carboxyl-free (meth)acrylic ester which is different from (a2), (a3), (a5), (a6) and (a7) and is copolymerizable with (a2), (a3), (a4), (a5), and (a6), or a mixture of such monomers, (a2) an ethylenically unsaturated monomer which carries at least one hydroxyl group per molecule and is essentially carboxyl-free, and is copolymerizable with (a1), (a3), (a4), (a5), (a6) and (a7) and is different from (a3), or a mixture of such monomers, (a3) at least one reaction product of acrylic acid and/or methacrylic acid with the glycidyl ester of an α-branched monocarboxylic acid having 5 to 18 carbon atoms per molecule or, instead of the reaction product, an equivalent quantity of acrylic and/or methacrylic acid which then, during or after the polymerization reaction, is reacted with the glycidyl ester of an α-branched monocarboxylic acid having 5 to 18 carbon atoms per molecule, (a4) optionally, an ethylenically unsaturated monomer which carries at least one carboxyl group per molecule and is copolymerizable with (a1), (a2), (a3), (a5), (a6) and (a7), or a mixture of such monomers, (a5) a polysiloxane macromonomer having a number-average molecular weight of from 1000 to 40,000 and on average from 0.5 to 2.5 ethylenically unsaturated double bonds per molecule or having on average from 0.5 to 2.5 epoxide groups per molecule, or a mixture of such monomers, (a6) an aromatic vinyl hydrocarbon, or a mixture of such monomers, and (a7) optionally, an essentially carboxyl-free, ethylenically unsaturated monomer which is copolymerizable with (a1), (a2), (a3), (a4), (a5) and (a6) and is different from (a1), (a2), (a3), (a5) and (a6), or a mixture of such monomers, wherein the nature and quantity of (a1), (a2), (a3), (a4), (a5), (a6) and (a7) are selected to provide a polyacrylate resin (A) having the desired OH number and acid number, and the quantity of component (a5) is less than 5% by weight, based on the overall weight of the monomers employed in preparing the polyacrylate resin (A), and wherein the polyacrylate resin (A) has an acid number of from 1 to 15.

2. Coating composition according to claim 1 further comprising at least one hydroxyl-containing, polyester-modified polyacrylate resin.

3. Coating composition according to claim 1 or 2, wherein the quantity of component (a5) is less than 3% by weight based in each case on the overall weight of the monomers employed in preparing the polyacrylate resin (A).

4. Coating composition according to claim 1 or 2, wherein the polyacrylate resin (A) is prepared using one or more polysiloxane macromonomers (a5) which are prepared by reacting from 70 to 99.999 mol % of a compound (1) represented by the formula (I)

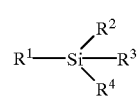

in which $R^1$ is an aliphatic hydrocarbon group having 1 to 8 carbon atoms or a phenyl radical and $R^2$, $R^3$ and $R^4$ are each a halogen radical or an alkoxy radical having 1 to 4 carbon atoms, or are a hydroxyl group, with from 30 to 0.001 mol % of a compound (2) represented by the formula (II)

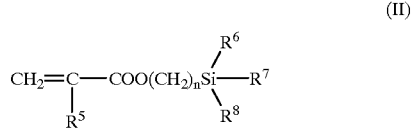
(II)

in which $R^5$ is a hydrogen atom or a methyl radical, $R^6$, $R^7$ and $R^8$ are each halogen, OH- or an alkoxy radical having 1 to 4 carbon atoms, or are an aliphatic hydrocarbon group having 1 to 8 carbon atoms, at least one of the radicals $R^6$, $R^7$ or $R^8$ is OH— or an alkoxy group and n is an integer from 1 to 6.

5. Coating composition according to claim 1 or 2, wherein the polyacrylate resin (A) is prepared using one or more polysiloxane macromonomers (a5) selected from the group consisting of macromonomers of formulas (I) or (II), wherein formula (I) is

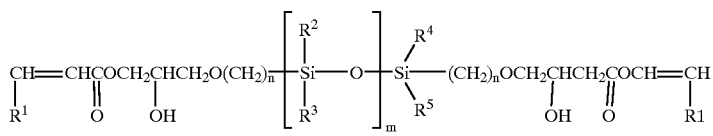

where
$R^1$ is H or $CH_3$
$R_2$, $R_3$, $R_4$, $R_5$ are identical or different aliphatic hydrocarbon radicals having 1 to 8 carbon atoms,
n is an integer from 2 to 5,
m is an integer from 8 to 80,
and formula (II) is

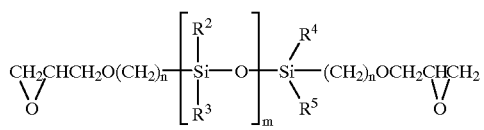

where
$R^1$, $R^2$, $R^3$, $R^4$, $R^5$ are identical or different aliphatic hydrocarbon radicals having 1 to 8 carbon atoms,
n is an integer from 2 to 5, preferably 3
m is an integer from 8 to 50.

6. Coating composition according to claim 5, wherein the polyacrylate resin (A) is prepared using one or more polysiloxane macromonomers (a5) of the following formula

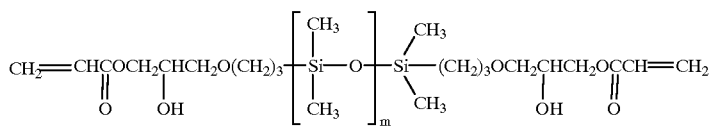

where m is an integer from 30 to 50.

7. Coating composition according to claim 1 or 2, wherein the polyacrylate resin (A) is prepared using a polysiloxane macromonomer (a5) having from 0.5 to 1.5 methacryloyl end group and having a number-average molecular weight of 5000.

8. Coating composition according to claim 1 or 2, wherein the polyacrylate resin (A) is prepared by polymerizing
    a1) from 5 to 74% by weight of component (a1),
    (a2) from 10 to 40% by weight of component (a2),
    (a3) from 10 to 50% by weight of component (a3),
    (a4) from 0 to 10% by weight of component (a4),
    (a5) less than 5% by weight of component (a5),
    (a6) from 5 to 40% by weight of component (a6) and
    (a7) from 0 to 40% by weight of component (a7),
the sum of the proportions by weight of components (a1) to (a7) being in each case 100% by weight.

9. Process for the preparation of the coating compositions according to claim 1 comprising mixing the polyacrylate resin (A), the isocyanate crosslinking agent (B), the hydroxyl-containing, polyester-modified polyacrylate resin (C), one or more organic solvents, optionally, compounds selected from the group consisting of pigments, fillers auxiliaries, additives and mixtures thereof and, optionally, dispersing the mixture.

10. Process for the production of a multilayer protective and/or decorative coating on a substrate surface, comprising the steps of
    (1) applying a pigmented basecoat to the substrate surface,
    (2) forming a polymer film from the basecoat applied in step (1),
    (3) applying a transparent topcoat comprising
        (A) a hydroxyl-containing polyacrylate resin
        (B) a crosslinking agent and
        (C) a hydroxyl-containing, polyester-modified polyacrylate resin to the basecoat thus obtained, and subsequently
    (4) curing basecoat and topcoat together, wherein the polyacrylate resin (A) comprises a polyacrylate (A) according to claim 1.

11. The coating compositions according to claim 1 or 2 wherein the coating comprises a clearcoat.

12. Coating composition according to claim 1 or wherein the quantity of component (a5) is from 0.1 to 1.0% by weight based in each case on the overall weight of the monomers employed in preparing the polyacrylate resin (A).

13. Coating composition according to claim 1 or 2, wherein the quantity of component (a5) is from 0.3 to 0.7% by weight, based in each case on the overall weight of the monomers employed in preparing the polyacrylate resin (A).

14. Coating composition according to claim 5, wherein the polyacrylate resin (A) is prepared using one or more polysiloxane macromonomers (a5) of the following formula

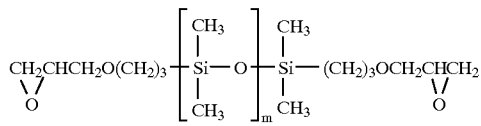

where m=50 and having an epoxy equivalent weight of 1900.

15. Coating composition according to claim 1 or 2, wherein the polyacrylate resin (A) is prepared using a polysiloxane macromonomer (a5) having from on average having one methacryloyl end group and having a number-average molecular weight of 5000.

16. Coating composition according to claim 1 or 2, wherein the polyacrylate resin (A) is prepared by polymerizing
   (a1) from 5 to 30% by weight of component (a1),
   (a2) from 15 to 25% by weight of component (a2),
   (a3) from 15 to 40 by weight of component (a3),
   (a4) from 0.1 to 6% by weight of component (a4),
   (a5) from 0.1 to 1% by weight of component (a5),
   (a6) from 10 to 30 by weight of component (a6) and
   (a7) from 0 to 30% by weight of component (a7),
the sum of the proportions by weight of components (a1) to (a7) being in each case 100% by weight.

17. Coating composition according to claim 1 or 2 wherein the polyacrylate resin (A) is prepared by polymerizing
   (a1) from 5 to 30% by weight of component (a1),
   (a2) from 15 to 25% by weight of component (a2),
   (a3) from 15 to 40% by weight of component (a3),
   (a4) from 0.1 to 6% by weight of component (a4),
   (a5) from 0.3 to 0.7% by weight of component (a5),
   (a6) from 10 to 30% by weight of component (a6) and
   (a7) from 0 to 30% by weight of component (a7),
the sum of the proportions by weight of components (a1) to (a7) being in each case 100% by weight.

18. Process for the preparation of the coating compositions according to claim 2 comprising mixing the polyacrylate resin (A), the isocyanate crosslinking agent (B), the hydroxyl-containing, polyester-modified polyacrylate resin (C), one or more organic solvents, and optionally compounds selected from the group consisting of pigments, fillers auxiliaries, additives and mixtures thereof and, optionally, dispersing the mixture.

19. The coating compositions according to claim 1 or 2 wherein the coating comprises a refinish pigmented topcoat.

20. A coating composition comprising
   (A) at least one hydroxyl-containing polyacrylate resin and
   (B) at least one isocyanate crosslinking agent, wherein the polyacrylate resin (A) is obtained by polymerizing, in an organic solvent or solvent mixture and in the presence of at least one polymerization initiator,
   (a1) an essentially carboxyl-free (meth)acrylic ester which is different from (a2), (a3), (a5), (a6) and (a7) and is copolymerizable with (a2), (a3), (a4), (a5), and (a6), or a mixture of such monomers,
   (a2) an ethylenically unsaturated monomer which carries at least one hydroxyl group per molecule and is essentially carboxyl-free, and is copolymerizable with (a1), (a3), (a4), (a5), (a6) and (a7) and is different from (a3), or a mixture of such monomers,
   (a3) at least one reaction product of acrylic acid and/or methacrylic acid with the glycidyl ester of an α-branched monocarboxylic acid having 5 to 18 carbon atoms per molecule or, instead of the reaction product, an equivalent quantity of acrylic and/or methacrylic acid which then, during or after the polymerization reaction, is reacted with the glycidyl ester of an α-branched monocarboxylic acid having 5 to 18 carbon atoms per molecule,
   (a4) optionally, an ethylenically unsaturated monomer which carries at least one carboxyl group per molecule and is copolymerizable with (a1), (a2), (a3), (a5), (a6) and (a7), or a mixture of such monomers,
   (a5) one or more polysiloxane macromonomer of the formula

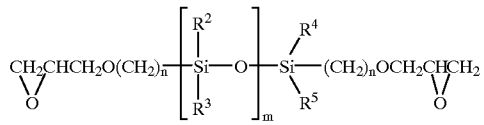

where $R^1$, $R^2$, $R^3$, $R^4$, $R^5$ are identical or different aliphatic hydrocarbon radicals having 1 to 8 carbon atoms, n is an integer from 2 to 5, and m is an integer from 8 to 50,
   (a6) an aromatic vinyl hydrocarbon, or a mixture of such monomers, and
   (a7) optionally, an essentially carboxyl-free, ethylenically unsaturated monomer which is copolymerizable with (a1), (a2), (a3), (a4), (a5) and (a6) and is different from (a1), (a2), (a3), (a5) and (a6), or a mixture of such monomers,
wherein the nature and quantity of (a1), (a2), (a3), (a4), (a5), (a6) and (a7) are selected to provide a polyacrylate resin (A) having the desired OH number and acid number, and the quantity of component (a5) is less than 5% by weight, based on the overall weight of the monomers employed in preparing the polyacrylate resin (A).

* * * * *